6514X
D. Harrington,
Rocking Chair,
Patented Apr. 23, 1831.
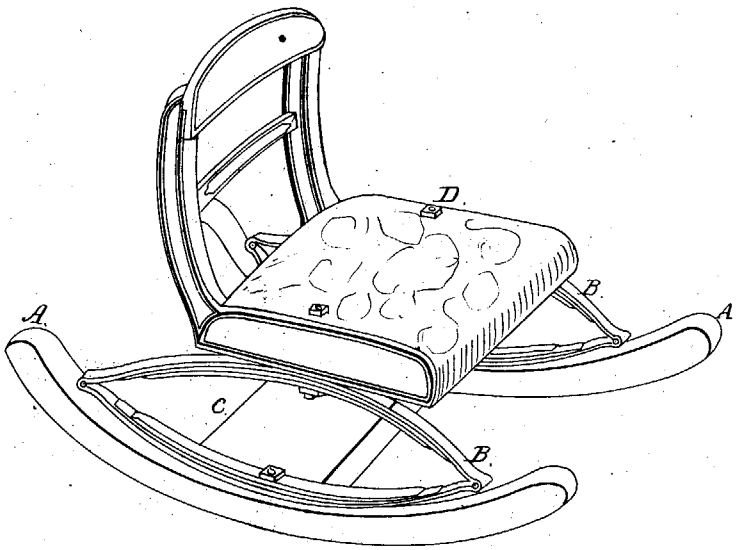
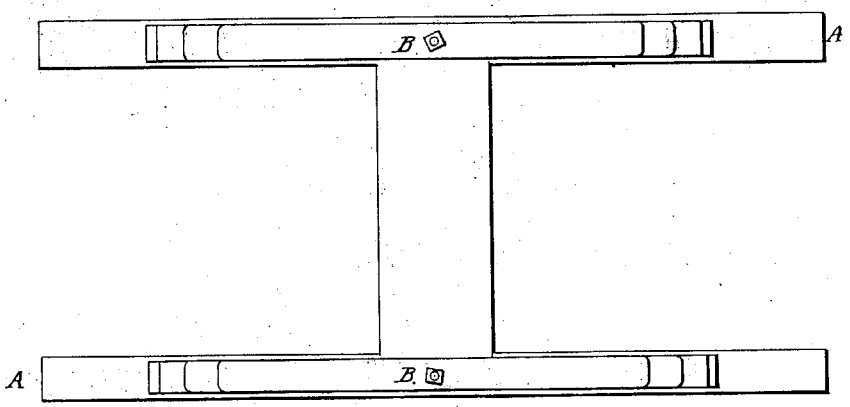
N. PETERS, PHOTO-LITHOGRAPHER, WASHINGTON, D. C.

Daniel Harrington

The Schedule referred to in these Letters Patent and mak-
ing part of the same containing a description in the words of
the said Daniel Harrington himself of his improvement
for giving motion or exercise to invalids in their rooms of
confinement. To all to whom these presents shall come
Be it known that I Daniel Harrington of Philadelphia
in the County of Philadelphia and State of Pennsylva-
nia have invented a new and useful improvement
in a machine for the use of invalids and the following is
a full and exact description of the construction and op-
peration of the said machine as invented by me denom-
inated the health vehicle. The undersigned by his
arrangement, adaptation and combination of certain
parts of machinery (not in themselves new but former-
ly used for various purposes) thus forming by a compos-
ition of parts a new machine or engine never before con-
structed and thereby imbodying a principle (like a soul
in a body) and applying said principle through said en-
gine to the bodies of invalids in their rooms houses or
yards of their houses, so that they may derive the health-
ful (life giving) exercise (principle) that is usually re-
ceived from riding upon the back of a trotting or rock-
ing horse, or in a two or four wheeled carriage. The
base or lower part of this engine is formed by a pair
of rockers in form nearly similar to the rockers attached
to common rocking chairs only larger in all respects.
The length of these rockers, forming said base, is three
and a half feet each they may be longer or shorter. The
height of these rockers in their centres as they stand on the
floor is six inches each, they may be higher or lower
at their ends where they turn up and thereby form a part
of a circle. their depth from upper ~~side~~ to under side is [illegible]

two inches at each end, or one and a half inch would
be amply sufficient. Their thickness is one and three quar-
ter inch, or they may be two inches in thickness. These
rockers may be made of wood of any kind perhaps Mahog-
any is as good as any other wood, or they may be made
of Metal. These rockers are fastened together near their mid-
dle by a pice of wood or iron tenoned at each end (and
fitted into a mortise in each rocker and made fast by
pins or screws These rockers when connected together,
centre and may be the same width or distance apart at their
as above said,) are sixteen inches apart at their front
and back ends or they may be somewhat wider in front
and narrower behind as it is usually the case with
common rocking chairs. The pice with which they are
connected at their centre is six inches wide and two inches
thick. These rockers as above described, form the base or
ground work of the health Vehicle The next part or se-
ries of the same resting upon the rockers at or near their
middle and fastened to them by substantial screws
with nuts consist of three pair of eliptic springs made
of steel. Three of these springs attached together at their
middle one above the other with a thin (or thick) inter-
mediate substance (leather or wood) by two screws at
each middle with nuts form, together with the rocker
beneath, a spring leg: and both of them a pair of spring legs
(tho' connected at their base by the six inch pice above said)
calculated to give a rolling or rocking motion or a perpen-
dicular motion according to the exertion of the invalid
occupying the seat above, said elliptic springs which
seat is now to be described. Upon these elliptic springs at
their tops and attached at their middle on each side by two
substantial screws with nuts, rests a seat in the form of
a chair without common legs, the spring legs coming in place
of common legs, for the invalid to sit on and receive the exer-
cise riage desirable from the vehicle. The form and dimensions of the said chair must be such as the invalid wishes for, or can best occupy, some cases of disease require one form, and some cases other forms — see drawing deposited in the patent office. These elliptic springs are similar in their form to those of the same name used by carriage makers, but for this purpose as described above, they are found to answer best when made of only four pieces of tempered steel each; say two of the pieces longer and connected [illegible] together at their extremities by screws, and two of them shorter and lying on the outside of the [illegible] longer pieces and made fast at their middle by a rivet in each. These pieces of tempered steel are, all of them, one quarter of an inch in thickness at their middle and thence become thinner towards their ends, say at their ends, in thickness, one eighth of an inch, or for a vehicle for a light person one twelfth of an inch in thickness their width from end to end is the same say one and three quarters inch. The longest and lowest of these springs is two and a half feet each, the next above is two feet three inches, and the next above (and last) is two feet — say in length all of them. These springs are set apart in their middle, each of them about five inches, while they curve towards and connect together at their ends, A single spring attached to each rocker might form a pair of spring legs for a health vehicle; but two, three or even five would be better as furnishing a much greater degree of elasticity and consequently a better motion, These steel springs when exposed to view have a coarse or unfinished appearance and should be covered with moreen, or some other kind of stuff, in the form of drapery, but this latter is not absolutely necessary as it is only for appearance. The undersigned verily believes that

6514X that he is the first person who has taken hold of the principle
in idea above named and embodied it so to speak, like
a soul in a body, and rendered it in a manner tan-
gible, its effects self evident through the powers of the [illegible]
health vehicle. He therefore hereby asserts his exclusive
claim to the aforesaid "principle" as well as the means of apply-
ing it i.e. the health vehicle, being as before said,
the first person who has successfully applied the same to
the alleviation or relief of the miseries of the human family
in all cases from the infant in the arms to the adult
of the age of an hundred years. The aforesaid "principle"
contended for as above by the undersigned, he denominates
an operative cause terminating in successive activity
(of duration longer or shorter as may be needful) tending
to a renovation of health, its life giving influence at-
tainable through the use of the health vehicle, within
doors, in any local situation under all the various cir-
cumstances of weather and climate. The same principle
tending to the same effect as above described and above
hinted at in these words, "Some cases of disease require one
form (of seat) and some cases other forms" has been em-
bodied by the undersigned by the adaptation and
application of the same spring legs and rockers to the
under side of the top part of a saddle. (Mans saddle
or Womans saddle) resting on them at their tops (and
made fast to them with screws. These saddles to be used
in the same way, as when on the back of a horse. Also
the same spring legs and rockers have been adapted
and applied to a lounge resting on them at their top
and fastened to them by screws, this latter to meet the cases
of invalids who require a recumbent posture of the body. In
all of these forms, say mens or womens saddles, lounges the
the object of the undersigned has been to render the same
operative exercise (life giving principle) attainable by invalids of
every description, from the bed rid to the sitting walking
or riding invalid. On their application to a saddle
the spring legs and rockers are brought nearer together,
and in their application to a lounge they are extended
further apart. Springs denominated eliptic or -
Eliptical may be made of wood also of various substan-
ces besides steel, but such if made by another person.
for the above described purpose would be considered
an invasion of this Specification and consequently of the
rights of the under signed. Also grass hopper springs,
straight springs, (pieces) with intermediate pieces be-
tween their extremities operate on the same principle
& are virtually the same. with eliptical springs
in as much as they yield or give, from their centre to-
wards their extremities alike. The mode of using this
health vehicle is as follows. If the invalid sits in
a chair resting upon the spring legs, if his strength
will admit of it, a mixed motion of the arms in the
way of swinging them say oblique or perpendicular will
give to him through the aid of the vehicle a gentle or se-
vere motion similar to the trot or rack of a horse or
the pole of a Carriage, according to his exertion, if he
sits upon a saddle, the same exertion will produce the
same effect. if however the case requires it a friend or
servant must give the necessary exercise to the invalid
by applying his hand or foot to the vehicle. If a lounge
is used the aid of a friend or servant will be requisite
to give through the vehicle the needful exercise. If
an infant or child receives exercise from the vehicle.
it must of necessity be through the aid of the nurse or
some other person giving motion to the same.

Witness. Wm. L. Dillingham     Daniel Harrington
S. Dillingham
[illegible]